United States Patent
Ahn et al.

(10) Patent No.: US 10,302,257 B2
(45) Date of Patent: May 28, 2019

(54) LAMP APPARATUS FOR VEHICLE

(71) Applicants: Hyundai Motor Company, Seoul (KR); Kia Motors Corp., Seoul (KR); SL Corporation, Daegu (KR)

(72) Inventors: Byoung Suk Ahn, Gwacheon-si (KR); Jik Soo Shin, Incheon (KR); Ki Hong Lee, Seoul (KR); Jung Wook Lim, Seoul (KR); Keun Sig Lim, Hwaseong-si (KR); Cheol Min Park, Seoul (KR); Hyo Kyoung Kim, Gyeongsan-si (KR); Sung Wook Yoon, Seoul (KR)

(73) Assignees: Hyundai Motor Company, Seoul (KR); Kia Motors Corp., Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 15/813,381

(22) Filed: Nov. 15, 2017

(65) Prior Publication Data

US 2018/0340659 A1    Nov. 29, 2018

(30) Foreign Application Priority Data

May 23, 2017    (KR) .......................... 10-2017-0063378

(51) Int. Cl.
*F21V 7/00* (2006.01)
*F21K 9/64* (2016.01)
(Continued)

(52) U.S. Cl.
CPC .................. *F21K 9/64* (2016.08); *B60Q 1/04* (2013.01); *F21K 9/237* (2016.08); *F21S 41/143* (2018.01);
(Continued)

(58) Field of Classification Search
CPC ... B60Q 1/04; F21K 9/237; F21K 9/64; F21K 9/68; F21S 41/125; F21S 41/141; F21S 41/143; F21S 41/147; F21S 41/148; F21S 41/19; F21S 41/30–41/338; F21S 41/60; F21S 41/67; F21V 7/04; F21V 7/08
(Continued)

(56) References Cited

U.S. PATENT DOCUMENTS 9,335,016 B2 *  5/2016  Nakazato ............. B60Q 1/0023
2016/0290584 A1 * 10/2016  Nomura .................. H01S 5/005

FOREIGN PATENT DOCUMENTS

JP          5122542 B2    11/2012
JP       2015-115276 A    6/2015
(Continued)

*Primary Examiner* — Jason M Han

(74) *Attorney, Agent, or Firm* — Morgan, Lewis & Bockius LLP

(57) ABSTRACT

A lamp apparatus for a vehicle may include a light source device configured to irradiate light; a detector configured to be distanced from the light source device and detect the light irradiated from the light source device, verifying whether the light source device is operating abnormally; and a reflector configured to have the light irradiated from the light source device incident thereon and reflect a portion of the light irradiated from the light source device wherein a portion of the light reflects toward the detector while reflecting the light irradiated from the light source device such that the light reflects toward a front of the vehicle.

8 Claims, 4 Drawing Sheets

(51) Int. Cl.
*F21K 9/237* (2016.01)
*F21V 7/08* (2006.01)
*B60Q 1/04* (2006.01)
*F21S 41/19* (2018.01)
*F21S 41/143* (2018.01)
*F21S 41/60* (2018.01)
*F21S 41/32* (2018.01)
*F21Y 115/10* (2016.01)

(52) U.S. Cl.
CPC ............... *F21S 41/19* (2018.01); *F21S 41/32* (2018.01); *F21S 41/60* (2018.01); *F21V 7/08* (2013.01); *B60Q 2300/054* (2013.01); *F21Y 2115/10* (2016.08)

(58) Field of Classification Search
USPC ................. 362/276, 507, 516–518, 543–545
See application file for complete search history.

(56) References Cited

FOREIGN PATENT DOCUMENTS

JP 5907384 B2 4/2016
KR 10-2016-0044157 A 4/2016

\* cited by examiner

LAMP APPARATUS FOR VEHICLE

CROSS-REFERENCE(S) TO RELATED APPLICATIONS

The present application claims priority to Korean Patent Application No. 10-2017-0063378, filed on May 23, 2017, the entire contents of which is incorporated herein for all purposes by this reference.

BACKGROUND OF THE INVENTION

Field of the Invention

The present invention relates to a lamp apparatus for a vehicle configured for preventing a laser beam, which is harmful to a human body, from being directly irradiated to a person from a head lamp using laser.

Description of Related Art

Generally, as a head lamp illuminates a road in front of a vehicle by irradiating light in a progress direction of the vehicle while the vehicle is running, the head lamp provides visual information to a driver by irradiating light to the road in front of the vehicle while the vehicle is driven at night. As a result, as the driver secures a front field of view at night, he or she may confirm other vehicles and obstacles on a road, wherein safe driving may be ensured.

A high luminance light source is required to enhance nighttime long distance illumination performance, and the existing illumination device configuring such a lamp is configured to include a light source, a phosphor, and a reflecting surface.

Here, since the light source has to ensure high luminance, a laser light source is applied. The laser light source has a higher wavelength band than general illumination devices, and is therefore harmful to the human body when the human body is directly exposed to the laser beam.

Therefore, a wavelength band of light irradiated from the laser light source is adjusted as a color of the light is altered by the phosphor. As a result, there occurs a problem wherein light of a high wavelength irradiated from the laser light source is directly irradiated due to an unintended signal or breakage.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a lamp apparatus for a vehicle configured for preventing light of a high wavelength irradiated from a laser light source from being irradiated in its original form.

According to an exemplary embodiment of the present invention, there is provided a lamp apparatus for a vehicle including: a light source device configured to irradiate light; a detector configured to be distanced from the light source device, detecting light irradiated from the light source device to verify whether the light source device is operating abnormally; and a reflector configured to have the light irradiated from the light source device incident thereon, and reflect a portion of the light irradiated from the light source device wherein a portion of the light reflects toward the detector while reflecting the light irradiated from the light source device wherein the light reflects toward a front of the vehicle.

The light source device may include: an LED light source configured to irradiate light; and a phosphor configured to have the light irradiated from the LED light source irradiated thereon, and output the incident light as light having a specific color.

The light source device may further include a condensing lens disposed between the LED light source and the phosphor, condensing the light irradiated from the LED light source on the phosphor.

The reflector may include: a first reflecting surface configured to reflect the light irradiated from the light source device wherein the light reflects toward the front of the vehicle; and a second reflecting surface configured to reflect a portion of the light irradiated from the light source device wherein the light reflects toward the detector.

The second reflecting surface may be formed in an elliptical shape in which the phosphor is at a first focal point and the detector is at a second focal point, wherein the light irradiated from the phosphor is incident on the detector.

The first focal point may be disposed above the second focal point, and the second reflecting surface may be formed in the elliptical shape in a state in which the first focal point is disposed above the second focal point.

The lamp apparatus for a vehicle may further include: a housing in which the light source device, the detector, and the reflector are disposed, wherein in the housing, the LED light source, and the phosphor are disposed to irradiate light upwards, the phosphor and the detector are disposed to be distanced from each other in a front and rear direction, and the reflector is disposed above the light source device and the detector to cover the light source device and the detector.

The detector may be disposed behind the phosphor when viewed in an illuminating direction of the lamp apparatus.

The housing may include a first mounting portion on which the light source device is mounted and a second mounting portion disposed behind the first mounting portion while being distanced from the first mounting portion and having the detector mounted thereon, and a partition wall may be formed to protrude between the first mounting portion and the second mounting portion permitting the light irradiated from the light source device to be incident on the second reflecting surface.

The detector may transmit a signal corresponding to the light irradiated from the light source device to a controller, and the controller may be configured to verify whether the light source device is operating abnormally based on the signal transmitted from the detector, and prevent the light from the light source device from being irradiated when it is determined that the light source device is operating abnormally.

The detector may detect the wavelength of the light irradiated from the light source device, and the controller may determine that the abnormality of the light source device occurs when the wavelength of the light detected by the detector is not within a predetermined reference range.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
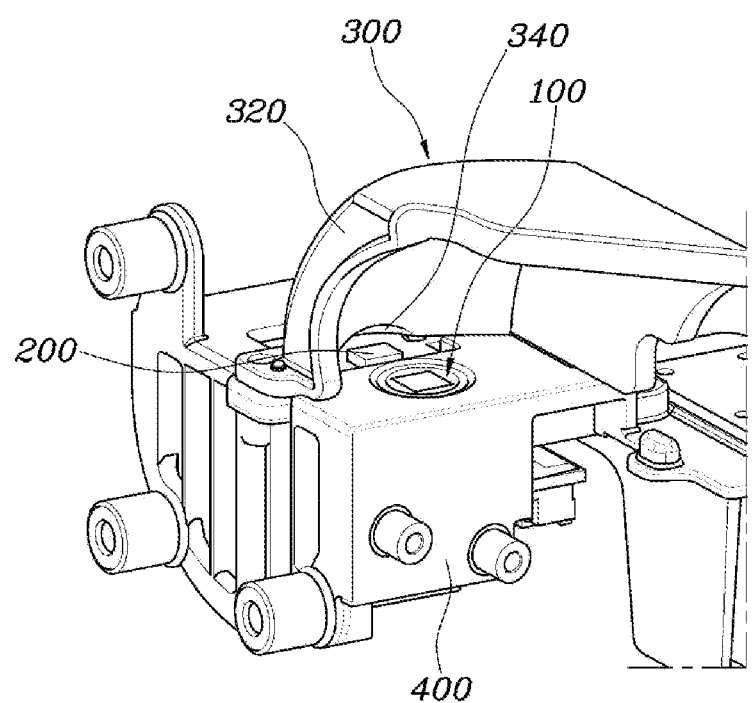
FIG. 1 is a diagram illustrating a lamp apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed here, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
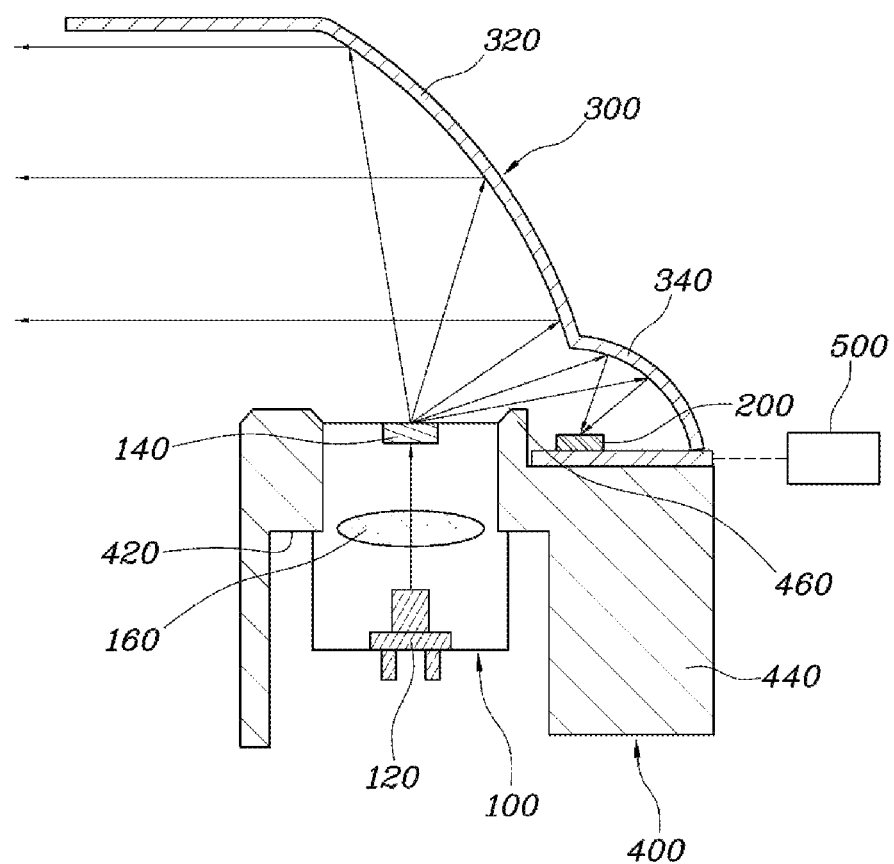
FIG. 2 and FIG. 3 are diagrams for describing the lamp apparatus for a vehicle as illustrated in FIG. 1.
Figure 3:
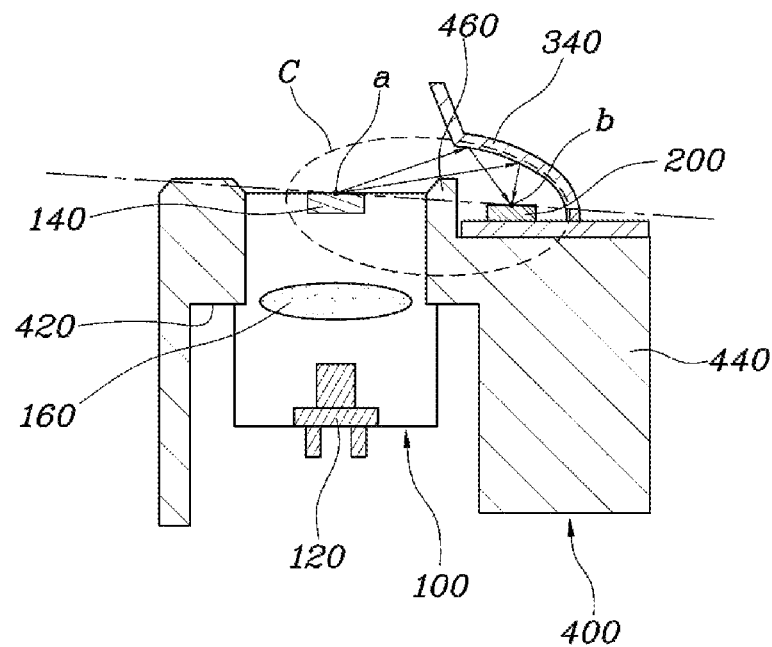
Figure 4:
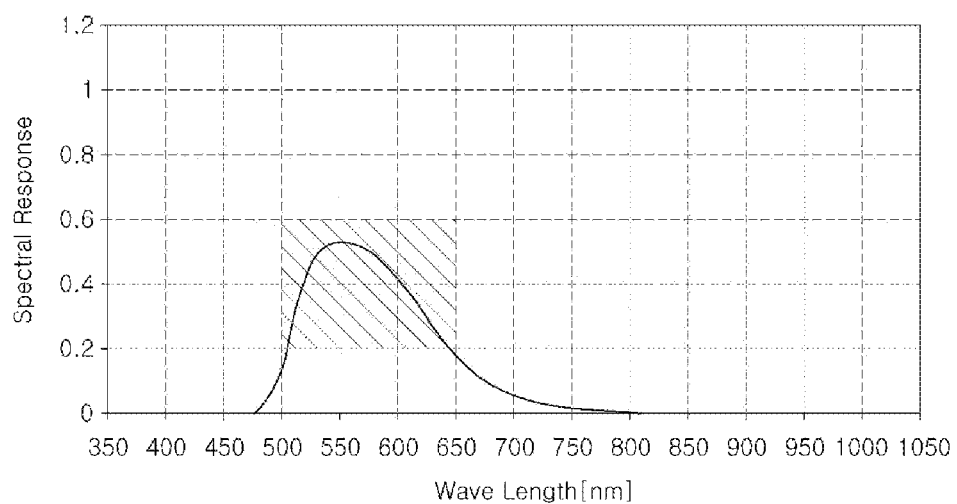
FIG. 4 and FIG. 5 are graphs describing a control of the lamp apparatus for a vehicle as illustrated in FIG. 1.
Figure 5:
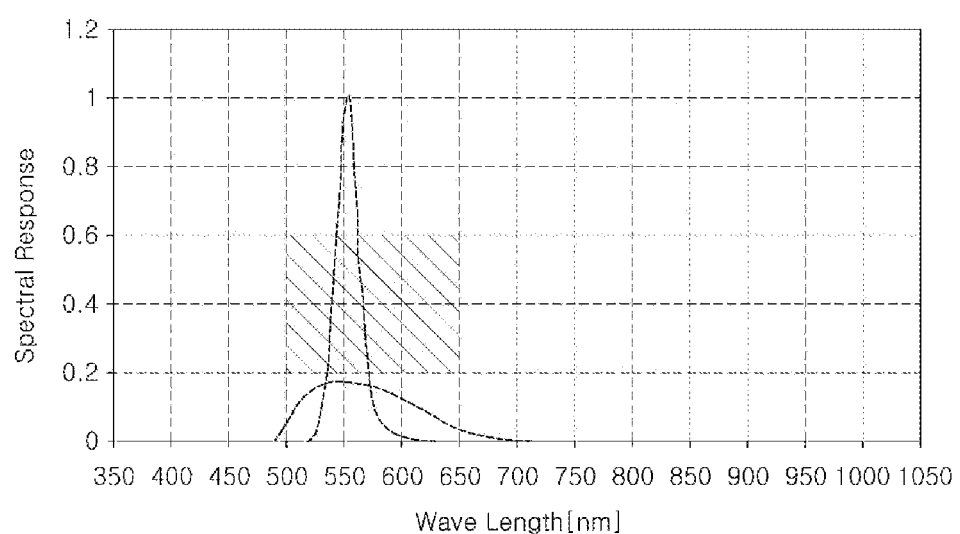

FIG. 1 is a diagram illustrating a lamp apparatus for a vehicle according to an exemplary embodiment of the present invention, FIG. 2 and FIG. 3 are diagrams for describing the lamp apparatus for a vehicle as illustrated in FIG. 1, and FIG. 4 and FIG. 5 are diagrams for describing a control of the lamp apparatus for a vehicle as illustrated in FIG. 1.

As shown in FIG. 1 and FIG. 2, the lamp apparatus for a vehicle according to an exemplary embodiment of the present invention may include a light source device 100 configured to irradiate light; a detector 200 configured to be distanced from the light source device 100 and detect light irradiated from the light source device 100 to verify whether the light source device 100 is operating abnormally; and a reflector 300 configured to have the light irradiated from the light source device 100 incident thereon and reflect a portion of the light irradiated from the light source device 100 wherein a portion of the light reflects toward the detector 200 while reflecting the light irradiated from the light source device 100 wherein the light reflects toward a front of the vehicle.

As described above, the present invention has the light source device 100, the detector 200, and the reflector 300, in which the reflector 300 is configured to reflect a portion of the light irradiated from the light source device 100 toward the detector 200 while reflecting the light irradiated from the light source device 100 wherein the light reflects toward the front of the vehicle.

That is, most of the light irradiated from the light source device 100 is irradiated to the front of the vehicle by the reflector 300, and a portion of the light irradiated from the light source device 100 may reflect toward the detector 200 by the reflector 300 to verify whether the light source device 100 is operating abnormally by the detector 200. Only a portion of the light radiated from the light source device 100 by the reflector 300 reflects to the detector 200, wherein a quantity of light irradiated toward the front of the vehicle is not reduced, and it is determined whether the light source device 100 is operating abnormally using the light incident on the detector 200 to accurately determine whether the light source device 100 is operating abnormally.

Describing in detail the present invention as described above and as shown in FIG. 2, the light source device 100 may include the LED light source 120 configured to irradiate light; and the phosphor 140 configured to have the light irradiated from the LED light source 120 irradiated thereon and output the incident light as light having a specific color.

Here, the LED light source 120 may be a laser, and the phosphor 140 may be disposed at a position where a laser beam is incident from the LED light source 120, changing a color of the light irradiated from the LED light source 120 to a specific color.

That is, the phosphor 140 reacts to the laser beam irradiated from the LED light source 120 to output the light having the specific color. For example, the LED light source 120 is configured to irradiate a blue laser beam, and the phosphor 140 is formed in a yellow color and thus transmits the laser beam as a white color when the blue laser beam is incident, wherein the light irradiated from the LED light source 120 may be irradiated to be perceived as white light from the phosphor 140.

Here, the light source device 100 may further include a condensing lens 160 disposed between the LED light source 120 and the phosphor 140, configured to condense the light irradiated from the LED light source 120 on to the phosphor 140.

When the light irradiated from the LED light source 120 is incident, the condensing lens 160 projects the light wherein the light is condensed on to the phosphor 140, wherein a loss of the light irradiated from the LED light source 120 may be minimized, and a light transmission distance between the LED light source 120 and the phosphor 140 is reduced by the condensing lens 160, reducing the overall layout of the apparatus.

Meanwhile, the reflector 300 may include: a first reflecting surface 320 configured to reflect the light irradiated from the light source device 100 wherein the light reflects toward the front of the vehicle; and a second reflecting surface 340 configured to reflect a portion of the light irradiated from the light source device 100 wherein the light reflects toward the detector 200.

As can be appreciated from FIG. 2, the reflector 300 includes the first reflecting surface 320 and the second reflecting surface 340 that may be integrally connected to each other. Most of the light irradiated from the light source device 100 through the reflector 300 is reflected by the first reflecting surface 320 toward the front of the vehicle and a portion of the light irradiated from the light source device 100 is reflected by the second reflecting surface 340 toward the detector 200.

In detail, as shown in FIG. 2 and FIG. 3, the first reflecting surface 320 may be formed as a parabolic surface wherein the light irradiated from the light source device 100 is reflected toward the front of the vehicle, and the second reflecting surface 340 is formed in an elliptical shape, defined by region C, in which the phosphor 140 is a first focal point a and the detector 200 is a second focal point b, wherein the light irradiated from the phosphor 140 may be incident on the detector 200.

That is, the first reflecting surface 320 reflects light toward the front of the vehicle, and the second reflecting surface 340 reflects light toward the detector 200. The second reflecting surface 340 is formed in an elliptical shape C defined by the two focal points a and b.

As can be appreciated from FIG. 3, the second reflecting surface 340 is formed in an elliptical shape C in which the phosphor 140 is at the first focal point a and the detector 200 is at the second focal point b. That is, light starting from any one of the two focal points reaches the other opposite focal point thereof due to the characteristics of the ellipse C, wherein the light passing through the phosphor 140 which is at the first focal point a may be set to be incident on the detector 200 which is at the second focal point b. As a result, an incident quantity of light starting from focal points other than the first focal point a on the second focal point b is minimized, wherein the detector 200 may accurately detect the light passing through the phosphor 140 of the light source device 100 to reduce noise, preventing a malfunction by the accurate determination.

The first focal point a is disposed above the second focal point b, and the second reflecting surface 340 may be formed in an elliptical shape C in a state in which the first focal point a is disposed above the second focal point b. That is, the position of the phosphor 140 as the first focal point a is disposed above the detector 200 as the second focal point b, wherein a light quantity may be ensured wherein the light irradiated through the phosphor 140 is sufficiently incident on the detector 200. In addition, the light quantity of external light incident from the front of the vehicle onto the detector disposed under the phosphor 140 is minimized due to a height deviation occurring by disposing the first focal point a above the second focal point b, wherein the occurrence of noise may be reduced.

Meanwhile, as shown in FIG. 1 and FIG. 2, the lamp apparatus for a vehicle further includes a housing 400 in which the light source device 100, the detector 200, and the reflector 300 are disposed. In the housing 400, the LED light source 120 and the phosphor 140 may be disposed to irradiate light upwards, the phosphor 140 and the detector 200 may be disposed to be distanced from each other in a front and rear direction, and the reflector 300 may be disposed above the light source device 100 and the detector 200 to cover them.

By doing so, in the housing 400, the light source device 100 irradiating light upward and the detector 200 detecting light are disposed to be distanced from each other in the front and rear direction and the reflector 300 is disposed above the light source device 100 and the detector 200 to cover them, wherein the light irradiated from the light source device 100 may reflect toward the detector 200 as well as the front of the vehicle, reducing an overall size of the lamp apparatus for a vehicle depending on the disposition structure.

The detector 200 may be disposed behind the phosphor 140. By doing so, the quantity of the external light incident from the front on the detector 200 may be minimized, and as the detector 200 and the phosphor 140 at two focal points of the elliptical shape C are disposed, even when the detector 200 is disposed behind the phosphor 140, the light irradiated through the phosphor 140 may be incident on the detector 200 with a small mounting region. As a result, the size of the overall layout is reduced to increase a freedom of design.

Meanwhile, the above-described housing 400 may include a first mounting portion 420 on which the light source device 100 is mounted and a second mounting portion 440 disposed behind the first mounting portion 420 while being distanced from the first mounting portion 420 and have the detector mounted thereon, in which a partition wall 460 protrudes to permit the light irradiated from the light source device 100 to be incident on the second reflecting surface 340 may be formed between the first mounting portion 420 and the second mounting portion 440.

As can be seen from FIG. 3, in the housing 400, the LED light source 120 and the phosphor 140 of the light source device 100 are mounted in a row in the vertical direction through the first mounting portion 420, wherein the light irradiated upwards from the LED light source 120 may be irradiated upwardly by passing through the phosphor 140. Furthermore, the second mounting portion 440 is disposed behind the first mounting portion 420 while being distanced from the first mounting portion 420 and is mounted with the detector 200.

The partition wall 460 protrudes between the first mounting portion 420 and the second mounting portion 440, and may protrude at a predetermined height, permitting the light irradiated from the light source device 100 to be incident on the second reflecting surface 340. By doing so, as in the housing 400, the partition wall 460 is formed between the first and second mounting portions 420 and 440, the light irradiated from the light source device 100 disposed in the first mounting portion 420 is incident on the detector 200 disposed in the second mounting portion 440, and the external light incident from the front of the vehicle is blocked by the partition wall 460 wherein the light is not incident on the detector 200.

Meanwhile, the detector 200 transmits a signal corresponding to the light irradiated from the light source device 100 to a controller 500, and the controller 500 is configured to verify whether the light source device 100 is operating abnormally based on the signal transmitted from the detector 200 and prevent the light from the light source device 100 from being irradiated when it is determined that the light source device 100 is operating abnormally. Here, the fact that the light source device 100 is operating abnormally device that light harmful to a human body due to the damage of the phosphor 140 is irradiated externally. The controller 500 detects the abnormality of the light source device 100 to perform an ON/OFF control of the light source device 100.

That is, the controller 500 is configured to receive a signal corresponding to the light detected by the detector 200 and control the light source device 100, and determines whether the light source device 100 is operating abnormally based on the signal transmitted from the detector 200. Here, when it is determined that the light source device 100 is operating abnormally, the controller 500 restricts the light source device 100 to not be turned ON, preventing the light harmful to the human body from being irradiated due to an error.

The detector 200 detects the wavelength of the light irradiated from the light source device 100, and the controller 500 may determine that the abnormality of the light source device 100 occurs when the wavelength of the light detected by the detector 200 is not within a predetermined reference range.

That is, the detector 200 detects the wavelength of light and transmits the detected wavelength to the controller 500, and the controller 500 determines whether the wavelength of the light detected by the detector 200 is not within the reference range. Herein, the reference range is a wavelength range of the light irradiated from the LED light source 120 which is adjusted by the phosphor 140, which may be determined as a wavelength harmful to the human body when the light is not within the reference range.

By doing so, as shown in FIG. 4, when the wavelength of the light detected by the detector 200 is within the reference range, indicated by the hashed box, the controller 500 normally operates the light source device 100, and as shown in FIG. 5, when the wavelength of the light is out of the reference range, the controller 500 blocks the actuation of the light source device 100 to prevent light from being radiated externally, preventing the light harmful to the human body from being irradiated to a pedestrian.

According to the lamp apparatus for a vehicle having the above-described structure, when the wavelength of the light radiated from the light source device 100 is detected and the light harmful to the human body is unintentionally irradiated, the actuation of the light source device 100 is turned OFF to prevent the light harmful to the human body from being irradiated.

In addition, when the light irradiated from the light source device 100 is detected, the occurrence of errors due to external factors is minimized, and thus the lighting control of the light source device 100 is performed correctly.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing description of specific exemplary embodiments of the present invention has been presented for purposes of illustrative and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claimed appended hereto and their equivalents.

What is claimed is:

1. A lamp apparatus for a vehicle, comprising:
   a light source device configured to irradiate light;
   a detector configured to be distanced from the light source device and detect the light irradiated from the light source device, verifying whether the light source device is operating abnormally; and
   a reflector configured to have the light irradiated from the light source device incident thereon and reflect a portion of the light irradiated from the light source device, wherein the portion of the light reflects toward the detector while reflecting the light irradiated from the light source device, and wherein the light reflects toward a front of the vehicle,
   wherein the detector is disposed behind the light source device when viewed in an illuminating direction of the lamp apparatus,
   wherein the light source device includes:
      an LED light source configured to irradiate light; and
      a phosphor configured to have the light irradiated from the LED light source irradiated thereon and output the incident light as light having a predetermined color, wherein the reflector includes:
         a first reflecting surface configured to reflect the light irradiated from the light source device wherein the light reflects toward the front of the vehicle; and
         a second reflecting surface configured to reflect the portion of the light irradiated from the light source device wherein the light reflects toward the detector,
   wherein the lam apparatus further includes a housing in which the light source device, the detector, and the reflector are disposed,
   wherein in the housing, the LED light source and the phosphor are disposed to irradiate light upwards thereof, the phosphor and the detector are disposed to be distanced from each other in a front and rear direction, and the reflector is disposed above the light source device and the detector to cover the light source device and the detector,
   wherein the housing includes a first mounting portion on which the light source device is mounted and a second mounting portion disposed behind the first mounting portion while being distanced from the first mounting portion, the detector being mounted on the second mounting portion, and
   wherein a partition wall protruding in a predetermined height higher than the phosphor is disposed between the first mounting portion and the second mounting portion.

2. The lamp apparatus for the vehicle of claim 1, wherein the light source device further includes a condensing lens disposed between the LED light source and the phosphor, and configured to condense the light irradiated from the LED light source on to the phosphor.

3. The lamp apparatus for the vehicle of claim 1, wherein the second reflecting surface is formed in an elliptical shape in which the phosphor is at a first focal point and the detector is at a second focal point, such that the light irradiated from the phosphor is incident on the detector.

4. The lamp apparatus for the vehicle of claim 3, wherein the first focal point is disposed above the second focal point, and
   the second reflecting surface is formed in the elliptical shape when the first focal point is disposed above the second focal point.

5. The lamp apparatus for the vehicle of claim 1, wherein the detector is disposed behind the phosphor.

6. The lamp apparatus for the vehicle of claim 1, wherein the detector transmits a signal corresponding to the light irradiated from the light source device to a controller, and
   the controller is configured to verify whether the light source device is operating abnormally based on the signal transmitted from the detector and to prevent the light from the light source device from being irradiated when the controller determines that the light source device is operating abnormally.

7. The lamp apparatus for the vehicle of claim 6, wherein the detector detects a wavelength of the light irradiated from the light source device, and
   the controller is configured to determine that the abnormality of the light source device occurs when the wavelength of the light detected by the detector is beyond a predetermined reference range.

8. The lamp apparatus for the vehicle of claim 1, wherein the reflector includes:
   a first reflecting surface configured to reflect the light irradiated from the light source device, wherein the light reflects toward the front of the vehicle; and
   a second reflecting surface configured to reflect the portion of the light irradiated from the light source device, wherein the second reflecting surface is positioned lower than the first reflecting surface, and wherein the portion of light of the second reflecting surface reflects toward the detector.

* * * * *